United States Patent [19]

Miller

[11] Patent Number: 4,519,325
[45] Date of Patent: May 28, 1985

[54] GRAIN DRILL SUSPENSION SYSTEM
[75] Inventor: Larry C. Miller, Harper, Kans.
[73] Assignee: DewEze Manufacturing, Inc., Harper, Kans.
[21] Appl. No.: 439,999
[22] Filed: Nov. 8, 1982
[51] Int. Cl.³ .............................................. A01C 5/00
[52] U.S. Cl. ................................................... 111/85
[58] Field of Search .................... 111/52, 85, 87, 88, 111/59, 60, 61, 62; 172/307, 417, 484, 624.5, 497, 500, 705, 266–268, 501, 311; 280/104, 177–181

[56] References Cited

U.S. PATENT DOCUMENTS

| | | | |
|---|---|---|---|
| 2,560,702 | 7/1951 | Reaves | 172/307 X |
| 2,693,747 | 11/1954 | Tanke et al. | 172/307 X |
| 2,738,969 | 3/1956 | Morris et al. | 267/1 |
| 3,090,333 | 5/1963 | Caha | 111/85 X |
| 3,131,657 | 5/1964 | Morris | 111/59 |
| 3,237,702 | 3/1966 | Orendorff | 172/705 |
| 3,362,361 | 1/1968 | Morrison | 111/85 X |
| 3,450,074 | 6/1969 | Gatzke et al. | 111/52 |
| 3,493,055 | 2/1970 | Van Peursem | 172/705 X |
| 3,901,169 | 8/1975 | Ribouleau | 111/52 |
| 4,024,822 | 5/1977 | Ross et al. | 111/34 |
| 4,077,478 | 3/1978 | Neukom | 111/59 X |
| 4,116,140 | 9/1978 | Anderson et al. | 111/52 |
| 4,214,537 | 7/1980 | Bailey et al. | 111/85 |
| 4,273,057 | 6/1981 | Pollard | 111/85 |
| 4,275,670 | 6/1981 | Dreyer | 111/85 |
| 4,275,671 | 6/1981 | Baker | 111/85 |
| 4,307,674 | 12/1981 | Jennings et al. | 111/85 |
| 4,311,104 | 1/1982 | Steilen et al. | 111/59 X |
| 4,407,207 | 10/1983 | Dreyer | 111/88 |

FOREIGN PATENT DOCUMENTS

| 257998 | 11/1967 | Austria | 111/85 |
|---|---|---|---|
| 396059 | 5/1924 | Fed. Rep. of Germany | 172/484 |

Primary Examiner—James R. Feyrer
Attorney, Agent, or Firm—Litman, Day & McMahon

[57] ABSTRACT

A grain drill suspension system including a support member comprising a parallelogram link structure and a walking beam member. The walking beam member has furrow cutting discs attached to a front portion thereof and a press wheel attached to a rear portion thereof. The support member includes parallel vertical members and cross links. The walking beam is pivotally connected at a medial portion thereof to a rear vertical member of the parallelogram structure. A front vertical member is attached to a vertically adjustable attachment member associated with the suspension system. A first spring extends upwardly from a rear portion of the walking beam to the rear vertical member biasing the furrow cutting discs downwardly. A second spring cooperates with the front vertical member and the cross links resiliently urging the rear vertical member and walking beam downwardly. The springs, along with the position of the front vertical member, cooperate to determine the depth of the furrow cut by the furrow discs. The parallelogram support structure allows the furrow cutting discs to follow undulating terrain while maintaining a constant desired depth of the furrow.

3 Claims, 4 Drawing Figures

GRAIN DRILL SUSPENSION SYSTEM

BACKGROUND OF THE INVENTION

This invention relates to farm implements and in particular to such implements which are designed to plant seeds.

It is desirable when planting that a furrow in which the seeds are deposited be continuously dug at a constant desired depth in the soil. This assures that the newly planted seeds receive the correct amount of moisture and fertilizer.

Problems arise in providing such a uniform furrow and include the fact that a soil surface in which the furrows are formed is usually undulating and of varying degrees of hardness. Because of these and other factors there is a tendency in prior grain drills for digging furrows which are inconsistent in depth throughout a given field. Therefore a suitable suspension system for such grain drills is necessary to provide a uniform depth of furrow throughout a given field.

SUMMARY OF THE INVENTION

A grain drill suspension system adapted to be pulled by a prime mover such as a tractor across a field for planting seed therein is provided and comprises a parallelogram support member and a planting member. The planting member includes a walking beam having two angled furrow cutting discs rotatably mounted on a front portion thereof and a press wheel mounted on a rear portion thereof with a seed depositing tube positioned therebetween.

The support member comprises a parallelogram structure with parallel front and rear vertical support members having upper and lower parallel cross links pivotally connected therebetween. The walking beam is pivotally attached at a medial portion thereof for rotation about a transverse axis to a rear vertical member of the support structure. The front vertical support member is securely attached to a suitable vertically adjustable attachment member associated with the prime mover.

A first spring extends between the rear portion of the walking beam upwardly to the rear vertical support member of the parallelogram support member causing the walking beam to pivot about the transverse axis urging the cutting discs into soil engagement. A second spring engages one of the crosslinks of the parallelogram and the front vertical support member biasing the rear vertical support member and walking beam downwardly.

The vertical positioning of the front vertical support member, in cooperation with the first and second springs, defines the depth of the furrow cut by the cuttting device. Particularly, when the parallelogram front vertical member is lowered, a greater downward force is exerted by the rear vertical member onto the walking beam. This biases the furrow cutting discs downwardly causing the furrows to be urged to a greater depth. Conversely, when the front vertical support is raised, the downward force applied to the rear vertical member of the support member is decreased and therefore the depth of furrow cut by the furrow cutting discs is also decreased.

The first spring functions to continually bias the furrow cutting discs into a constant depth of cut while the second spring member, along with the parallelogram support member, allows the walking beam to follow the undulating terrain while maintaining a substantially constant furrow depth of cut.

OBJECTS OF THE INVENTION

Therefore, the objects of the present invention are: to provide a grain drill suspension system which will provide for a constant, uniform furrow depth of cut; to provide such a grain drill suspension system which allows a planting member thereof to follow undulating terrain such that a constant depth of furrow is continuously cut across the terrain; to further provide such a grain drill suspension system which includes as a support member thereof a parallelogram structure having parallel front and rear vertical support members and parallel cross links pivotally retained therebetween with the front support member being attached to a suitable vertically adjustable attachment member associated with a prime mover; to further provide for such a grain drill suspension system a planting member which includes a walking beam having a pair of furrow cutting discs rotatably mounted on a front portion thereof, a press wheel rotatably mounted on a rear portion thereof and a seed depositing tube positioned therebetween with the walking beam being pivotally attached near a medial portion thereof to a rear vertical member of the parallelogram structure for pivotal movement about a transverse axis; to further provide for such a grain drill suspension system a first spring member extending between the rear portion of the walking beam and the rear vertical support member for biasing the cutting discs downwardly into contact with an associated soil surface; to further provide for such a grain drill suspension system a second spring member which extends between the front vertical suspension member of the parallelogram structure and one of the cross lengths to bias the rear vertical support member and hence the walking beam downwardly such that the cutting discs are in continual engagement with the soil surface; and further to provide such a grain drill suspension system which includes few parts, is capable of providing a continuous furrow depth of cut, is easy to manufacture, extremely durable, and particularly well adapted for the intended usage thereof.

Other objects and advantages of this invention will become apparent from the following decription taken in conjunction with the accompanying drawings wherein are set forth, by way of illustration and example, certain embodiments of this invention.

The drawings constitute a part of this specification and include exemplary embodiments of the present invention and illustrate various objects and features thereof.

DETAILED DESCRIPTION OF THE PREFERRED EMBODIMENTS

Figure 1:
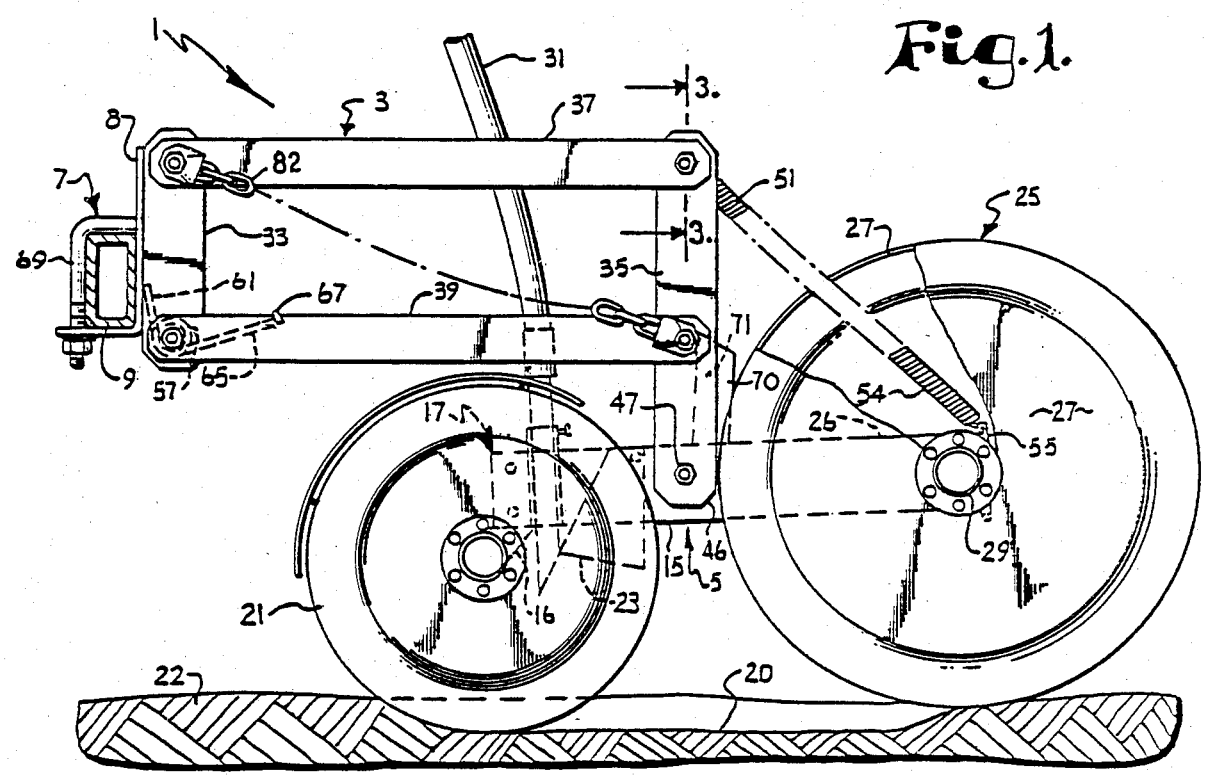
FIG. 1 is a side elevational view of a grain drill suspension system according to the present invention.
Figure 2:
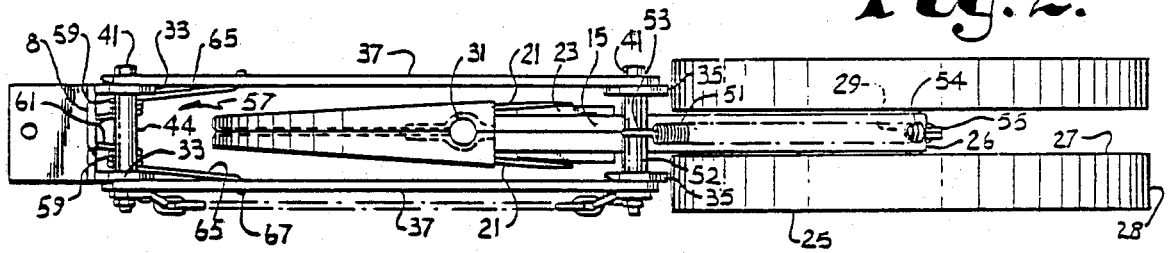
FIG. 2 is a top plan view of the grain drill suspension system.
Figure 3:
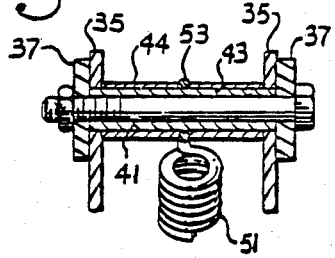
FIG. 3 is a cross-sectional view of the grain drill suspension system taken along lines 3—3 in FIG. 1.

As required, detailed embodiments of the present invention are disclosed herein, however, it is to be understood that the disclosed embodiments are merely exemplary of the invention which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

The reference numeral 1 generally designates a grain drill suspension system according to the present invention. The suspension system 1 generally comprises a support member 3 and a planting member 5. The support member 3 is attached by means of mounting bracket 8 to a suitable attachment member 7 associated with a prime mover (not shown). Particularly the attachment member 7 is shown herein as being a tool bar 9 associated with the prime mover. Preferably, the vertical position of the tool bar 9 is selectively adjustable. The prime mover is adapted to pull a seed planter employing the suspension system 1 across a field for the planting of seeds therein.

The planting member 5 comprises a walking beam 15 which includes furrow opening means such as cutting discs 21 rotatably mounted by a suitable mounting bracket 16 to a front portion 17 of the walking beam 15. The cutting discs 21 are generally flat and are angled inwardly near a lower front portion thereof such that when contacting a soil surface 22, they produce a furrow 20 by digging into the soil surface and displacing soil upwardly and outwardly therefrom. Scrapers 23 are provided and engage an inner surface of each disc 21 removing any buildup of soil which adheres to the respective disc inner surface. It is understood that, in keeping with the present invention, other furrow opening means could be utilized.

Figure 4:
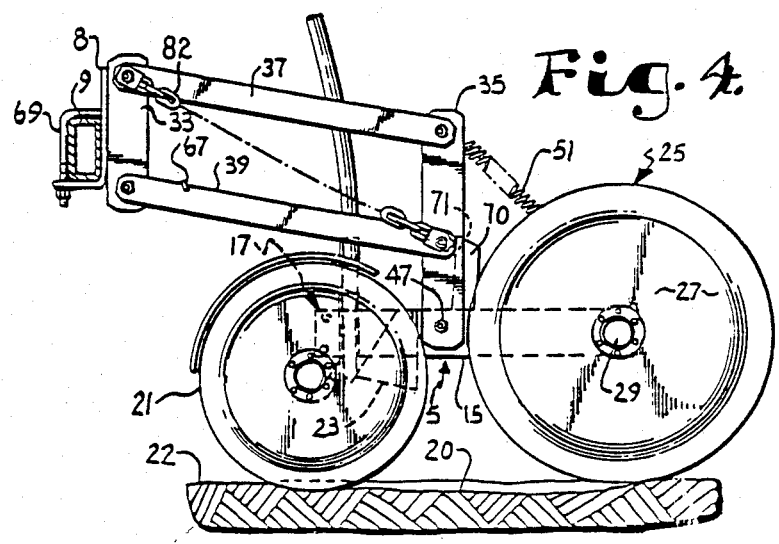
FIG. 4 is a side elevational view of the grain drill suspension system showing the suspension system cutting a shallower furrow than as shown in FIG. 1.

A furrow closing means, shown herein as a press or packing wheel 25, is provided for engaging and closing the furrow formed by the furrow opening means. The press wheel 25 is mounted on a rear portion 26 of the walking beam 15 and comprises a pair of facing plates 27 each having an edge surface 28. The plates 27 are attached to an axle 29 which rotates within a bushing (not shown) retained in a bore in the walking beam rear portion 26 the press wheel 25 and the cutting disc 21 are located relatively close to one another, as seen in FIGS. 1 and 4. Further, the press wheel 25 is substantially larger than the cutting disc 21.

A seed tube 31 is retained on the walking beam 15 between the cutting discs 21 and the press wheel 25. The seed tube 31 is in seed flow communication with a suitable supply of seed (not shown) such as a pressurized air seed supply system as is well known in the art.

The support member 3 comprises a parallelogram structure having pairs of front and rear vertical members 33 and 35 respectively and pairs of upper and lower cross links 37 and 39 respectively. The cross link pairs 37 and 39 are pivotally attached at their extremities to the front and rear vertical members 33 and 35 by suitable means such as bolts 41 which rotate in bushings 43 received in spacers 44. The spacers 44 are positioned between the associated pairs of vertical members 33 and 35, retaining them in a spaced apart relationship.

As seen herein, each rear vertical member 35 includes a lower portion 46 which extends downwardly below the bottom cross link pair 39. The walking beam 15 is pivotally attached near a medial portion thereof to the rear vertical member pair lower extremities 46 as by a suitable bolt or axle 47. The walking beam 15 is free to rotate about a transverse axis thereof defined by bolt 47.

A first biasing means, comprising a first spring member 51, extends between and is attached to the walking beam rear portion 26 and an upper spacer 52 associated with the rear vertical members 35. Particularly, as seen herein, an end 53 of the first spring 51 is wrapped around the rear vertical member upper spacer 52 and a second end 54 of the first spring 51 is secured to an attachment plate 55 on the walking beam rear portion 26. Spring 51 is expanded in installation whereby the spring 51 has a tendency to contract, urging the walking beam 15 to rotate about bolt 47 toward ground engagement.

A second biasing means, comprising a second spring member 57, cooperates with the front vertical member 33, along with mounting bracket 8, and one of the cross links, shown herein as the bottom pair of cross links 39, and tends to bias the cross links 39 downwardly along with the support member rear vertical members 35. The second spring member 57 comprises two springs 59 each of which includes a first finger portion 61 which bears against the mounting bracket 8 and a second finger 65 which has a hook portion 67 extending over a top surface of the lower cross links 39 biasing the cross links downwardly relative to the mounting bracket 8 and front vertical members 33.

A chain 82 extends between opposite ends of parallel links 37 and 39 so as to limit vertical movement of the rear vertical members 33 and 35, as seen in FIG. 4. The chain 82 is shown in FIG. 1 in a slack position, as when the drill 1 is operating on generally level ground.

A suitable clamp 69 is provided with the front mounting bracket 8 and extends over and securely captures the associated tool bar 9, securely retaining the grain drill suspension system 1 to the prime mover.

As is seen in FIGS. 1 and 4, a stop plate 70 is attached to, and projects upwardly from, the walking beam 15, along the medial portion thereof. As the walking beam 15 rotates counterclockwise (as seen in FIG. 4), a top portion 71 of the stop plate 70 eventually engages and abuts against the rear side of the spacer 44 associated with the pivot connection between the lower cross link 39 and the rear vertical member 35, so as to limit the rotation of the walking beam 15.

In use, the grain drill suspension system 1 allows a user thereof to continuously provide a constant depth of furrow when traversing both even and undulating terrain.

The depth of furrow is regulated by the vertical positioning of the front vertical members 33. The spring members cooperate to constantly urge the disc members 21 into the soil surface. As the front vertical members 33 are lowered, as by lowering the tool bar 9, the increased tension in the second spring member 57 exerts a greater downward force on the walking beam 15 which urges the cutting discs 21 further into the soil surface 22 because the press wheel 25 constantly rides on the soil surface 22. Conversely, as the front vertical members 33 are raised, such as to a position shown in FIG. 4, the downward force exerted by the second spring member 57 on the walking beam 15 and hence the cutting discs 21 is lessened, thereby decreasing the depth of cut of the discs 21.

Since the means providing the force for biasing the support member rear vertical members 35 along with the walking beam 15 downwardly is a resilient member, i.e. springs 59, the walking beam 15 is allowed to rise and fall relative to the front vertical members 33 as when traversing undulating terrain. Further, since the cutting discs 21 and press wheel 25 are attached to a vertical member of a parallelogram structure, rear vertical member 35, and since the vertical position of the cutting discs 21 and the press wheel 25 is defined by the position of the front vertical member 33, the relative position of the cutting discs 21 to the the press wheel 25 and, hence, the depth of furrow is maintained even as the grain system 1 traverses undulating ground causing the relative vertical position of the front and rear vertical members 33 and 35 to change.

It is to be understood that while certain forms of the present invention have been illustrated and described herein, it is not to be limited to the specific forms or arrangement of parts described and shown.

What is claimed and desired to secure by Letters Patent is:

1. A grain drill suspension system adapted to be attached to a prime mover for transferring a seed planter employing said suspension system across a field, said suspension comprising:
   (a) a mounting bracket for attaching said suspension system to the prime mover;
   (b) a parallel link structure attached to said mounting bracket and having parallel front and rear vertical members and parallel upper and lower cross links pivotally connected at extremities thereof to said front and rear vertical members; said front vertical member being attached to said mounting bracket; and said rear vertical member including a lower portion extending below said lower cross link;
   (c) an elongate walking beam having front, rear and medial portions thereof; said walking beam being pivotally attached to said rear vertical member lower portion along said walking beam medial portion;
   (d) a furrow cutting member being mounted on said walking beam front portion and adapted to be engageable with a soil surface for cutting a furrow therein;
   (e) a furrow closing member being mounted on said walking beam rear portion and adapted to be engageable with the furrow for closing and packing same;
   (f) a seed depositing member being retained between said furrow cutting and furrow closing members and adapted to deposit a succession of seeds into the furrow;
   (g) said upper and lower cross links comprising respective horizontally spaced pairs of upper and lower cross links; and means spacing said pairs of links sufficiently to allow said furrow cutting member to translate upwardly therebetween; and
   (h) a stop plate being attached to and extending upwardly from said walking beam medial portion; said stop plate engaging said parallel link structure at the pivotal connection between said rear vertical member and said pair of lower cross links upon rotation of said walking beam relative to said vertical member when said furrow cutting member is being urged downwardly so as to limit pivotal movement of said walking beam relative to said parallel link structure, thereby limiting to a controlled depth of the furrow cut by said furrow cutting member.

2. The system according to claim 1 wherein:
   (a) said furrow cutting member and said furrow closing member are located relatively close to one another; and
   (b) said furrow closing member is substantially larger than said furrow cutting member.

3. The system according to claim 1 including:
   (a) first biasing means comprising a first spring member attached to and extending between said walking beam rear portion and the pivotal connection between said rear vertical member and said pair of upper horizontal cross links, whereby said first spring member tends to contract and urge said walking beam to rotate about the pivotal connection between said walking beam medial portion and said rear vertical member lower portion therein;
   (b) said biasing means comprising a second spring member connected to said mounting bracket and said lower cross link at the pivotal connection between said lower cross link and said front vertical member, whereby said upper and lower cross links and said rear vertical member are biased downwardly toward ground engagement; and wherein
   (c) the depth of furrow is regulated by vertical positioning of said front vertical member, and the vertical positioning of the front vertical member is adapted to be cooperatively positioned by the prime mover.

* * * * *